(12) United States Patent
McKee Cooper et al.

(10) Patent No.: US 7,068,280 B1
(45) Date of Patent: Jun. 27, 2006

(54) METHOD AND APPARATUS TO PROVIDE OVERLAY BUFFERING

(75) Inventors: Joel C. McKee Cooper, Lafayette, CO (US); Raghunath Rao, Austin, TX (US); Miroslav Dokic, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 376 days.

(21) Appl. No.: 10/316,727

(22) Filed: Dec. 11, 2002

Related U.S. Application Data

(60) Provisional application No. 60/340,456, filed on Dec. 14, 2001.

(51) Int. Cl.
  G06T 1/60 (2006.01)
  G09G 1/399 (2006.01)
  G01C 7/10 (2006.01)
  G01C 8/00 (2006.01)

(52) U.S. Cl. .................. 345/530; 345/539; 365/189.04; 365/230.05

(58) Field of Classification Search ................ 345/530, 345/539, 541, 648, 649; 370/379, 381, 382; 365/219–221, 109.04, 230.05, 189.04; 341/100, 341/101; 710/71
  See application file for complete search history.

(56) References Cited

U.S. PATENT DOCUMENTS

| | | | |
|---|---|---|---|
| 5,926,120 A * | 7/1999 | Swenson et al. ............ 341/100 |
| 6,353,633 B1 * | 3/2002 | Her ........................ 375/240.18 |
| 6,788,617 B1 * | 9/2004 | Lee ............................ 365/240 |

* cited by examiner

*Primary Examiner*—Richard Hjerpe
*Assistant Examiner*—Hau Nguyen
(74) *Attorney, Agent, or Firm*—Steven Lin, Esq.

(57) ABSTRACT

Overlay buffering scheme for multi-channel data in which one memory buffer content is overlayed over another as memory locations of an input buffer are freed when data is output from the input buffer. By overlaying the buffer content, only one input buffer is used, reducing the needed memory by half.

14 Claims, 9 Drawing Sheets

METHOD AND APPARATUS TO PROVIDE OVERLAY BUFFERING

CROSS REFERENCE TO RELATED APPLICATION

This application claims the benefit of priority from U.S. Provisional Patent Application Ser. No. 60/340,456 entitled "DSP Audio Decoder" filed on Dec. 14, 2001.

FIELD OF THE INVENTION

Embodiments of the present invention relate generally to audio data processing and, more particularly, to a method and apparatus to provide overlay buffering.

BACKGROUND OF THE RELATED ART

Digital signal processors (DSPs) are employed in a variety of applications, including the processing of audio signals and/or data. DSPs typically have a digital signal processor core and associated memory as well as a variety of other circuitry. Many audio DSPs today utilize digital decoding and pulse coded modulation (PCM) to process audio data. Typically, PCM post-processing is performed on multiple channels of audio data in which a DSP processor receives blocks of decoded audio data from the decoder. The decoded data is usually provided to the DSP processor one channel at a time. The number of samples in each block of data is usually related to the particular decoding algorithm utilized and, in current decoders, the decoding block ranges from approximately 16 to 1024 samples for each channel. Since many post-processing algorithms require data from all of the channels simultaneously, the DSP typically buffers at least one block of data for each channel as it is received from the decoder before post processing is performed.

In a common prior art technique, double-buffering is employed to buffer blocks of decoded audio data. In a double-buffering scheme, two separate memory buffers are utilized to buffer the decoded data for processing. One memory buffer is loaded with decoded data, which is then post-processed. While post-processing is occurring on the first buffer, the second buffer is employed to collect a new set of data blocks from the decoder. Each time a new set of data fills one buffer and post-processing completes on the other buffer, the buffers swap their operation so that post-processing executes on the buffer with the new data while the buffer previously used for post-processing is now collecting the next set of data blocks.

Double-buffering allows post-processing to occur continuously without stalling while new decoded data is collected and allows decoding to occur continuously without stalling while old data is post-processed. Double-buffering is a simple algorithm to develop and maintain. The main drawback of double-buffering is that it requires two buffers, which becomes problematic in systems with limited memory resources especially as the size of the decoded blocks increases. As the block size and number of channels increase, the memory requirements may become prohibitive for the particular DSP. For example, double-buffering for 8 channels with a block size of 1024 samples per channel requires 16,384 (16K) words of memory (8×1024×2=16K). Accordingly, when additional channels or larger block sizes are employed, the increase in buffer size is multiplied by a factor of two (2) since two complete buffer memories are needed.

In a typical data processing scheme operated using the prior art scheme, two separate input buffer units (e.g., double-buffering) would be needed. One input buffer would be utilized to receive the data input while the second buffer, having been loaded with earlier data, would then supply the data to the processing buffer for the DSP to process. Once all of the data in the first input buffer is post-processed and the second buffer is filled with new data, the two buffers switch roles. Employment of a single buffer of decoded data for post-processing by a DSP while maintaining the throughput normally associated with double-buffering is advantageous and desired.

SUMMARY

Overlay buffering for multi-channel data is a scheme in which the content of one memory buffer is overlayed by another as memory locations are freed as data is processed. In one embodiment, decoded data in the form of 1024-sample blocks for each of eight channels is loaded serially into an 8K buffer. Once the buffer is full, post-processing begins on all eight channels in parallel, and data is consumed from the buffer one sample at a time across all channels. As 128 samples are processed across all eight channels, 1024 (128×8) locations in memory are freed providing room for the next 1024-sample block of decoded data for one channel. In one embodiment, the memory is conceptually arranged in an eight by eight matrix in which each cell represents 128 samples. Each set of eight (one set for each channel) 1024-sample blocks is first loaded into memory as eight 1024-sample rows, next as eight 1024 sample columns, and alternately storing in rows and columns in this manner thereafter. In other embodiments, different block sizes and/or numbers of channels may be utilized. However, such variations are within the scope and spirit of the present invention. Furthermore, in one embodiment, data is moved from the overlay buffer to a separate eight channel by 128-sample (8×128=1K) buffer for in-place post-processing.

BRIEF DESCRIPTION OF THE DRAWINGS

Embodiments of the present invention are illustrated by way of example and not for the purpose of limitation. In the Figures of the accompanying drawings, similar references are utilized to indicate similar elements.

DETAILED DESCRIPTION OF THE INVENTION

A method and apparatus to provide overlay buffering for a digital signal processor (DSP) are described herein. In the following detailed description, numerous specific details pertaining to a digital signal processor are set forth. However, these descriptions and other specific details may not be necessary to practice the embodiments of the present invention described herein.

Figure 1:
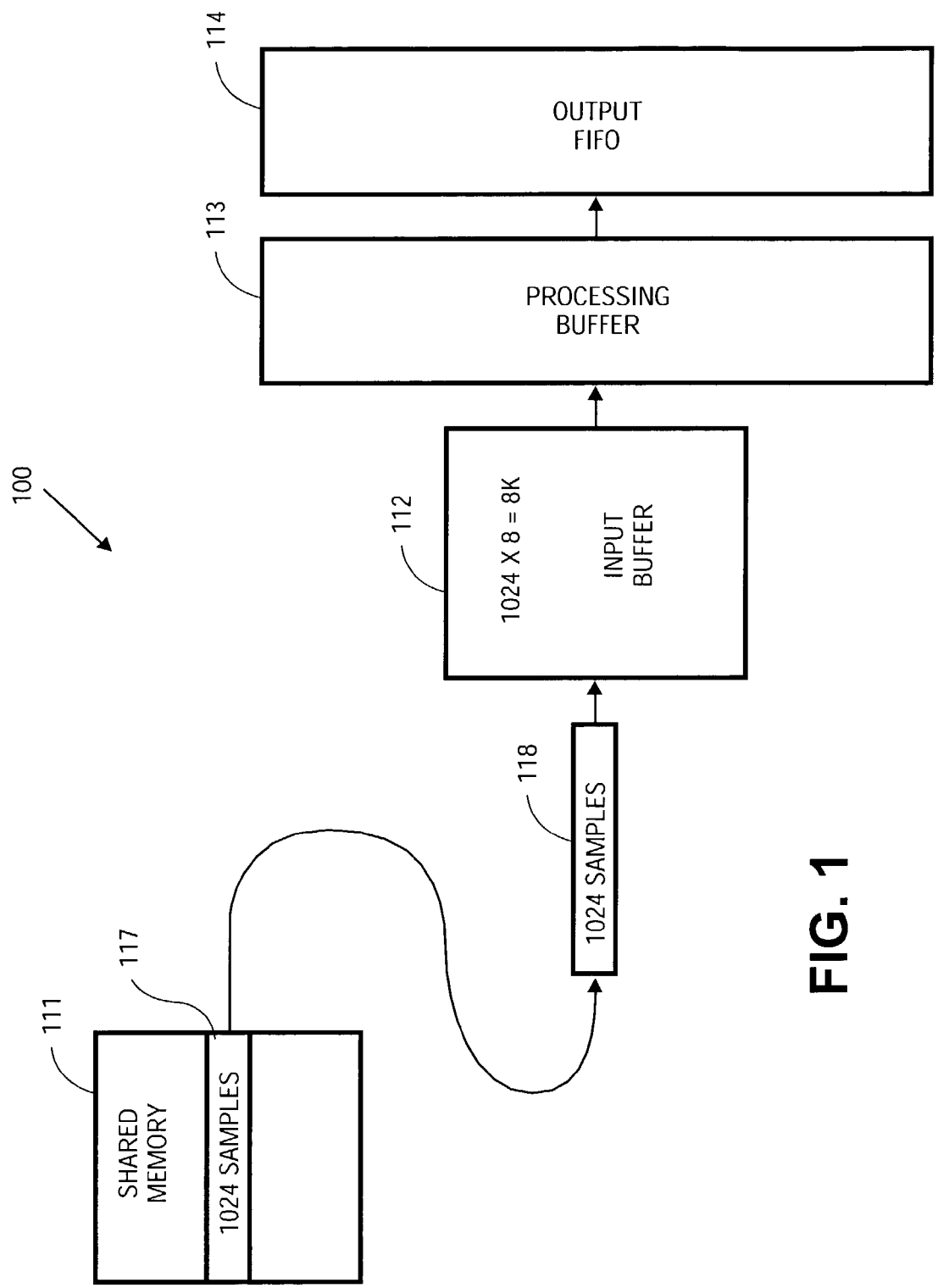
FIG. 1 shows a block schematic diagram of the various memory units employed to process data and in which the input buffer allows the overlaying of new data into locations that are freed as data is output from the input buffer.

Referring to FIG. 1, one embodiment of an overlay buffering scheme of the present invention is shown. Instead of switching between two complete buffer memories to buffer and process audio data, the invention allows for less memory to be employed due to the overlaying of the new data over old data within the same, single buffer memory. Accordingly, instead of employing two separate buffer memories, in which one buffer memory collects the new data, while the second buffer provides the data for post-processing, the overlaying scheme allows less than two complete buffers to be utilized to perform the same operation. In the particular embodiment described, the use of the two buffer memories in the prior art are combined into a single buffer, wherein the overlaying of new data over old data allows for the same operative effect for a given data size but with half the memory requirement.

In FIG. 1, a memory system 100 is shown in which several different memory units are shown. The memory units shown include a shared memory 111, input buffer memory 112, processing buffer memory 113, and an output first-in-first-out (FIFO) memory 114. Various memory units 111, 112, 113, 114 shown may include different memory components, or one or more of the memory units may be a portion of the same memory component, such as main memory of a DSP. Memory units 111–114 are shown as separate units for their operational features and are not intended necessarily to show a separation of memory units from a hardware perspective. In the particular embodiment shown, memory unit 111 is a shared memory unit accessible by more than one component or device. For example, in one embodiment described below, memory unit 111 is associated with two DSPs. One DSP provides the decoding and the second DSP performs the post-processing of the decoded data.

A particular entry location 117 of shared memory unit 111 is illustrated. FIG. 1 shows an audio data 118 of entry 117 being moved to a location within input buffer unit 112. Generally, for the embodiments shown in FIG. 1, audio data is initially decoded by a decoder of a DSP, and the decoded data is stored in shared memory unit 111. Although memory unit 111 is illustrated as a shared memory, memory unit 111 need not be a shared memory in all applications. Furthermore, decoded audio data is stored within a location 117 of memory unit 111 for subsequent loading into input buffer unit 112. In other embodiments, audio data 118 may be from another location or device. For example, audio data 118 may be coming from an input port if the decoding is performed by a separate decoding device.

Input buffer unit 112 receives the decoded audio data, such as data 118, and stores the data input until the DSP needs it for post-processing. The data is then transferred to processing buffer 113 for processing by a processing unit such as the processing core of a DSP. Once the DSP processes the data in processing buffer 113, the processed data is then placed in output FIFO unit 114 as processed data out. Memory system 100 shown in FIG. 1 utilizes only one input buffer unit 112 since new data input is overlayed over previous data no longer needed in input buffer 112.

The particular embodiment shown as system 100 in FIG. 1 is designed to accommodate the decoding and processing of data using Advanced Audio Coding (AAC) data format decoding protocol (such as, for example, the IS13818-7 MPEG-2 Advanced Audio Coding). However, other protocols may be readily used. In the exemplary embodiment, 1024 (1K) samples of data are decoded for a given channel defined in the encoded stream. In other words, the decoder decodes a 1024-sample block for the first channel, then a 1024-sample block for the second channel, then the third, etc., until 1024 samples have been decoded for each of the encoded channels. As each 1024-sample block is decoded, it is transferred to the post-processor, which buffers all N channels of data. Even if no post-processing is to be performed, this buffering is employed so that the multi-channel data can be output coherently. For example, the first sample from the first channel is played at the same time as the first sample from the last channel. Thus, for an 8 channel decoding scheme, the general practice is to buffer 8K (1024×8 channels) of decoded data before any data is post-processed or output.

Accordingly, for the particular arrangement of samples shown, shared memory unit 111 holds 1024 samples of data for a given channel. A shared memory entry, such as entry 117, contains 1024 samples from the same channel. A next entry then contains 1024 samples of another channel. In the example of a system employing eight channels, a total of 8K of decoded data is made available across all 8 channels, which is stored in buffer unit 112 one channel at time.

With the particular AAC decoding scheme illustrated, the post processing is achieved over all the channels at the same time; the first sample of the first channel is processed at the same time as the first sample of the other channels. In the particular embodiment shown as system 100, data is moved in 16-sample segments from input buffer 112 to processing buffer 113, post-processed in-place in processing buffer 113 in 16-sample blocks, and moved sample-by-sample into output FIFO unit 114 for output.

In FIG. 1, the decoder coupled to shared memory 111 generates 1024 samples for all channels before any data can be post-processed or output. With sampling frequency 'Fs', a maximum average decode time of (1024/Fs)/N for one 1024-sample block from an N-channel stream is provided.

For an 8-channel system, this decode time equates to $(1024/Fs)/8=128/Fs$. Memory system 100 is post-processing and outputting one sample from each channel every sample period. In an 8-channel system, eight samples are sent out every 1/Fs. Thus, in the same time that it takes the decoder to decode one 1024-sample block (128/Fs), memory system 100 outputs 128 samples from each channel, or 128×8=1024 total samples. Since this value is greater than or equal to the block size (1024), an overlaying scheme may be established, in which the memory locations freed by the output of data is used for the storage of new, decoded data, even though an entire 1024-sample block has not been freed from any individual channel.

Since the new 1024-sample block of data for one channel is stored in locations that were freed across many channels in input buffer 112, an addressing scheme is utilized that is different than what would be used for double-buffering. One exemplary embodiment of such a scheme is illustrated in the sequence of data transfer to and from input buffer unit 112 shown in FIGS. 2–7.

Figure 2:
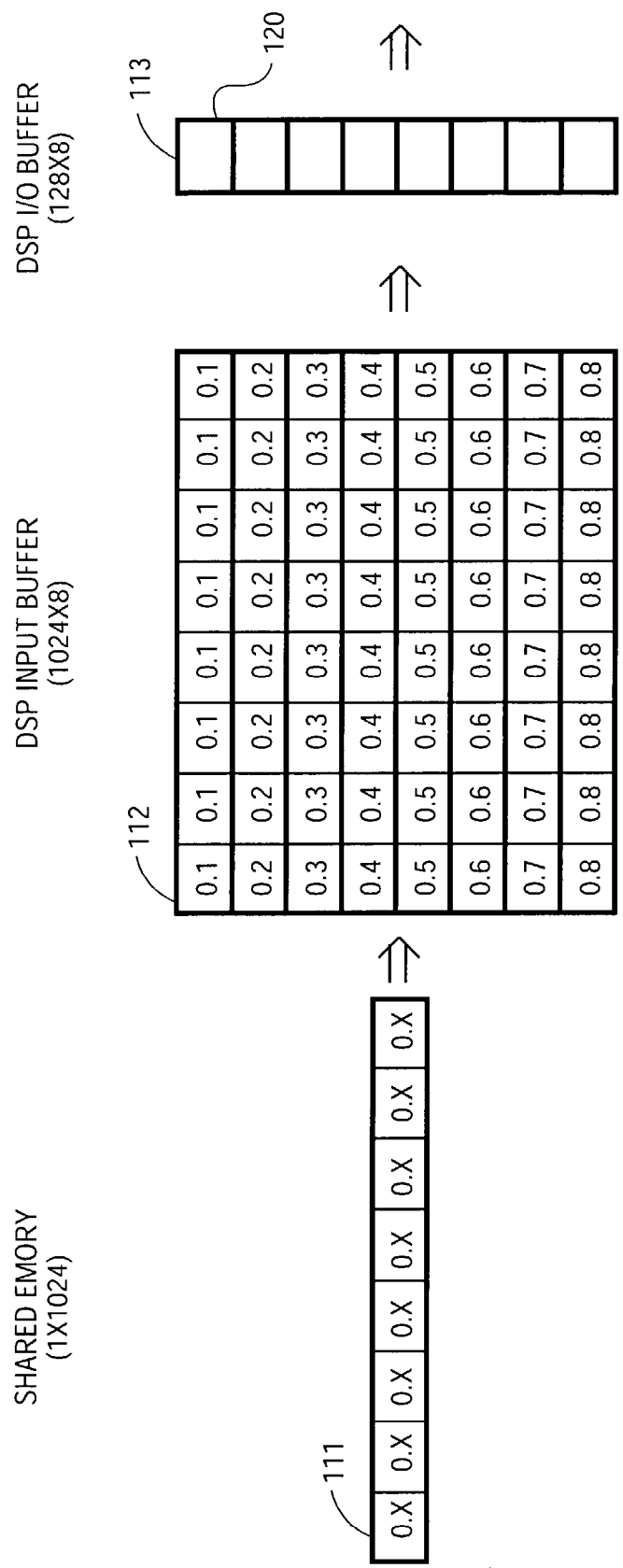
FIG. 2 illustrates a memory mapping of data for an initial set (set zero) having data from each of channels one through eight occupying a row of the eight by eight input buffer matrix.

Referring to FIGS. 2–7, shared memory 111 is shown as a 1024-sample memory, and the input buffer unit 112 is shown as an (8×1024) 8K-sample memory. As audio data is decoded, 1024 (1K) samples (sample block) of a given channel are loaded into shared memory unit 111. This decoded audio data is then transferred into buffer unit 112. FIG. 2 shows the situation when 8 channels of decoded data (1024×8) are loaded into input buffer unit 112. The data is loaded serially one channel at a time. Thus, data from the first channel are shown across the top row of the input buffer unit 112 and designated as 0.1 (the 0 denoting the initial set of data and the number to the right of the decimal signifying the channel number, e.g. 1 signifying channel 1). The second row of 1024 samples, which correspond to the 1K sample block from the second channel, are noted as 0.2 in buffer memory unit 112. The remaining channels are similarly shown with the 1K data of channel 8 noted as 0.8 in the very last row of input buffer unit 112. FIG. 2 also shows only processing buffer unit 113 as part of an input/output (I/O) buffer 120. FIFO unit 114 is not shown but may be part of I/O buffer unit 120 or separate from I/O buffer unit 120. With reference to FIGS. 2–7, I/O buffer 120 stores 1024 (128×8) samples and shows only that portion operating as processing buffer unit 113 of FIG. 1.

Individual blocks within buffer memory 112 correspond to 128 sample segment blocks (or sample segments). Accordingly, 8 segments of 128 samples provide the 1K of data in a given row or the 1 K of data in a given column. Since 8 channels exist, buffer memory 112 is arranged as a 8×8 matrix of segment blocks. Assigning an address location to each of the segment blocks allows the 8×8 matrix of 128 samples to be individually accessed.

Figure 3:
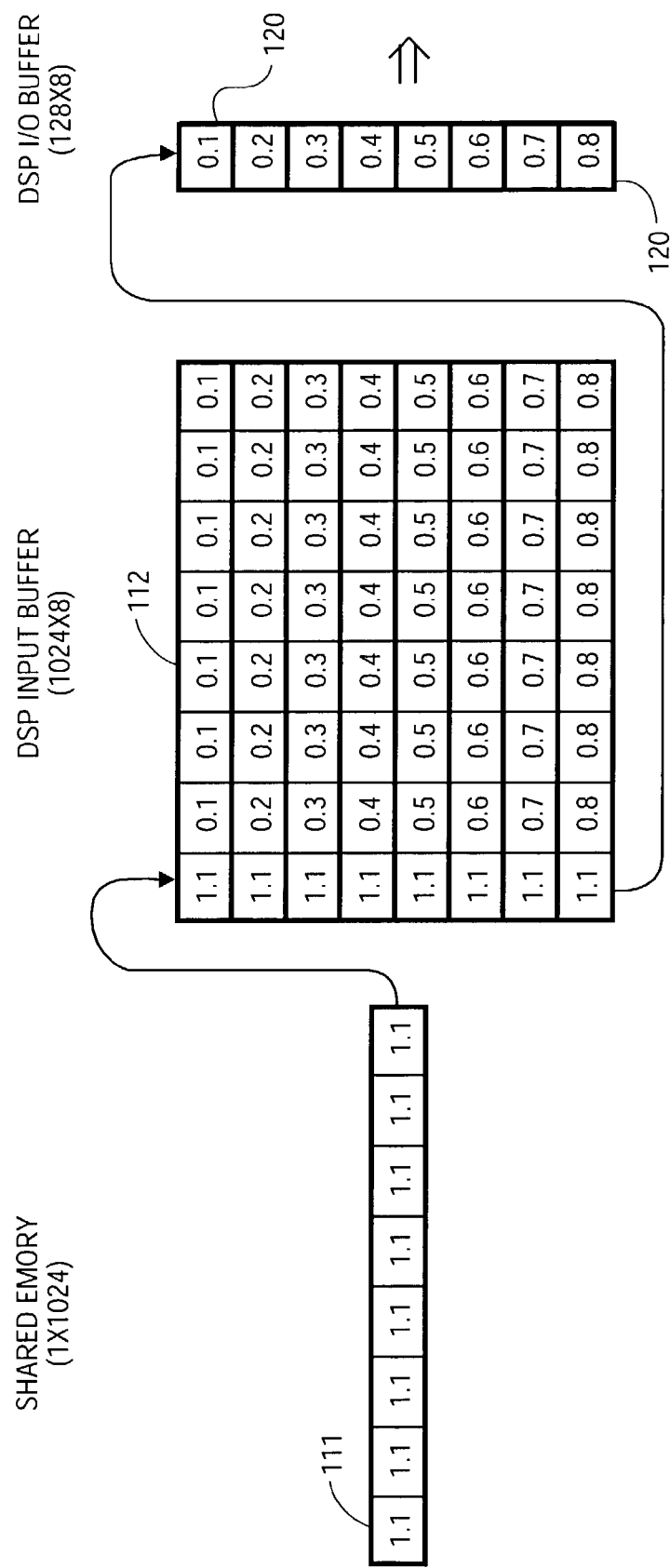
FIG. 3 illustrates a memory mapping of data when 128 samples for all 8 channels located in the first column of the input buffer of FIG. 2 are output for post-processing and 1024 samples of new data from a first channel of a second set (e.g., set one, channel one) are placed into the first column locations of the input buffer.

In FIG. 3, the DSP copies the first 128 samples (first sample segment block) of the 8 channels into I/O buffer unit 120 and begins the post-processing on this data. The 0.1–0.8 blocks from column 1 of buffer unit 112 of FIG. 2 are transferred into the first column of I/O buffer unit 120. I/O buffer unit 120 operates as processing buffer 113 of FIG. 1. During this period, shared memory 111 receives 1024 new samples of the first channel of the second set for transfer to the buffer unit 112. As soon as the first column of data (corresponding to first 128 samples for the 8 channels) are transferred to I/O buffer unit 120 in parallel, the memory locations corresponding to the first column of the input buffer are now available to receive the next 1024 samples designated as 1.1. Accordingly, the new 1024 samples (eight 128 sample segments) of the first channel are loaded into the address locations corresponding to the first column of the input buffer unit 112 as shown in FIG. 3. The overlaying of the new data into the buffer unit 112 commences, even though the buffer still has remaining data to output to I/O buffer 120 for processing. In FIG. 2, the first channel data was stored across the first row of input buffer unit 112, whereas now the subsequent 1024 samples of the first channel data are stored in the first column of input buffer unit 112. The reason for this transformation is that the input is performed per channel in serial fashion; however, the output to the I/O buffer unit 120 is achieved in parallel across 128 samples of all 8 channels. Thus, the second 1024 samples of the first channel are now overlayed within the first column of memory locations of input buffer unit 112.

Figure 4:
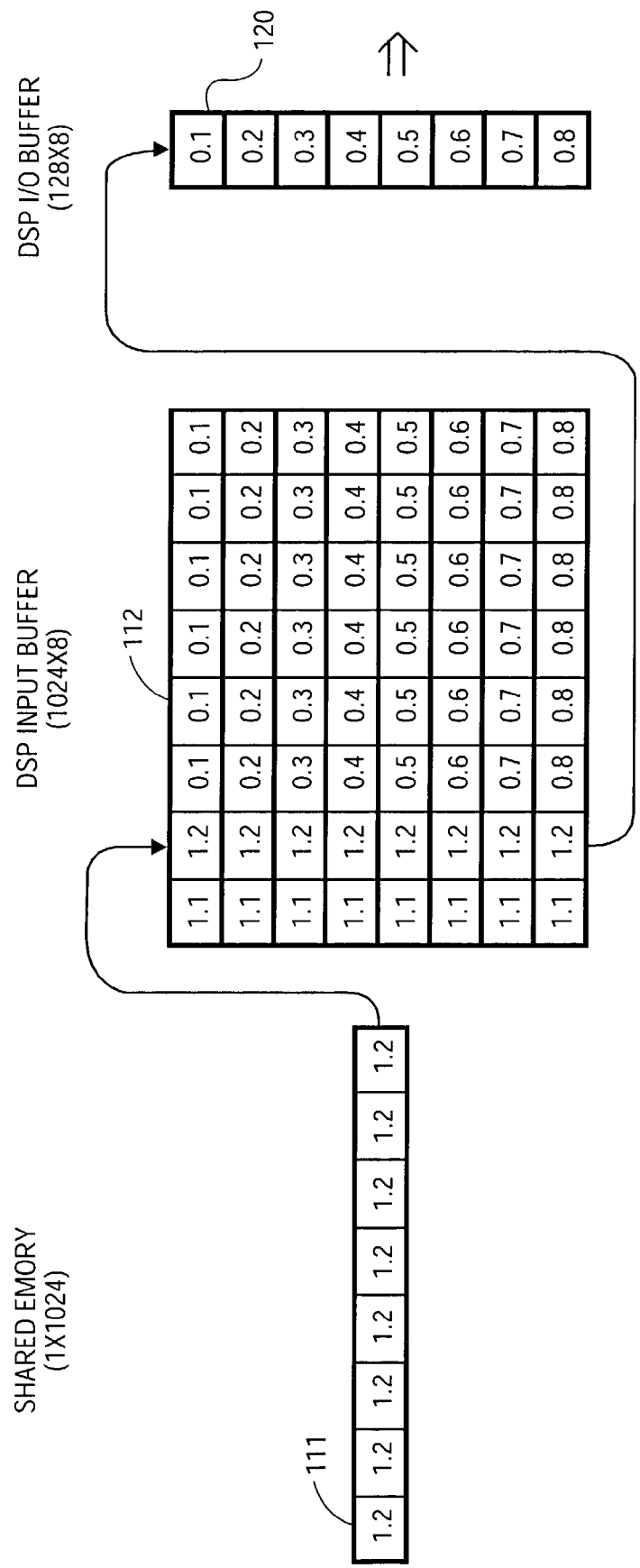
FIG. 4 illustrates a memory mapping of data when 128 samples for all 8 channels located in the second column of the input buffer of FIG. 3 are output for post-processing and 1024 samples of new data from a second channel of the second set (e.g., set one, channel two) are placed into the second column locations of the input buffer.

FIG. 4 shows the subsequent operation when the second 128 samples of each channel for the initial set of data are output to I/O buffer unit 120. The data that was present in column 2 of input buffer unit 112 are now loaded into the I/O buffer 120. In this instance, the original data has now been processed and sent to the FIFO unit for output. The second 128 samples from each channel are then input in the I/O buffer unit 120 for post processing by the DSP. Also, in FIG. 4, the second 1024 sample block (e.g., data segments 1.2) pertaining to the second channel now stored in memory unit 111 are now loaded into the second column of input buffer unit 112.

Figure 5:
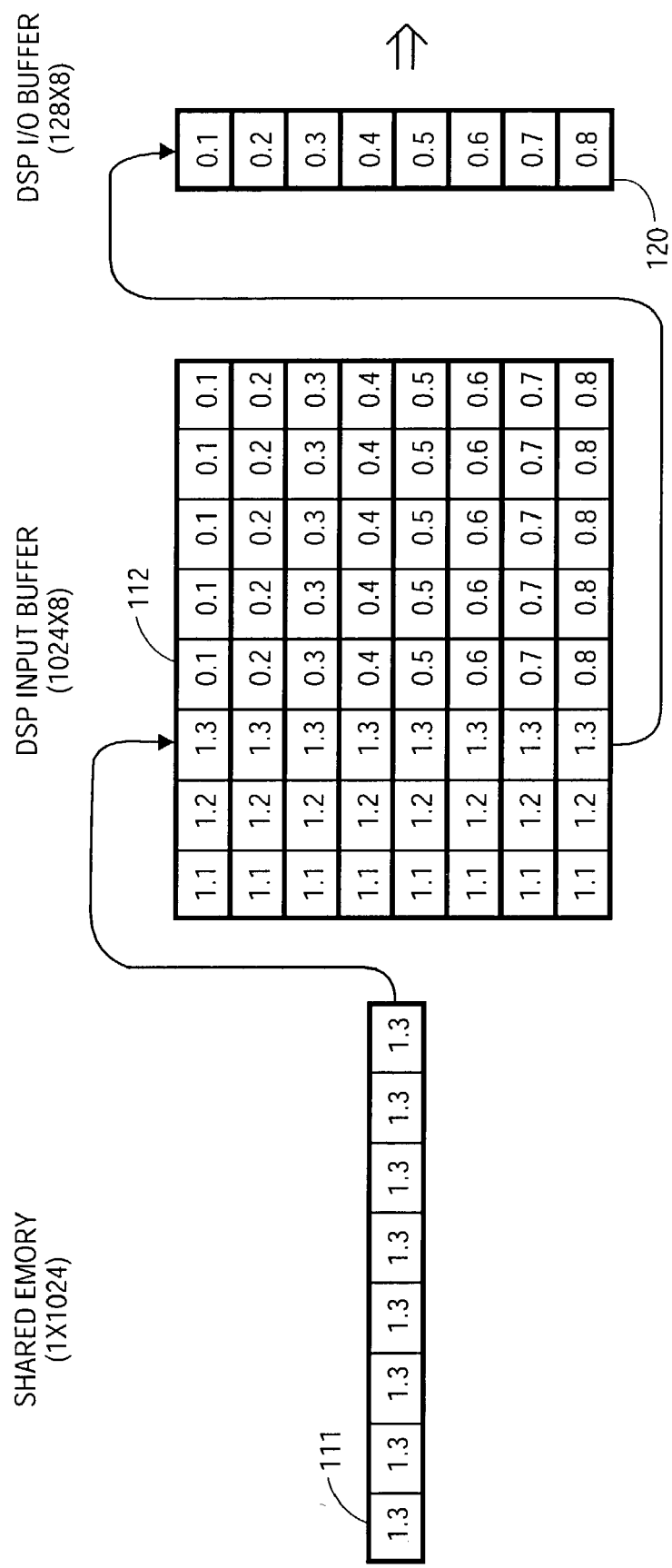
FIG. 5 illustrates a memory mapping of data when 128 samples for all 8 channels located in the third column of the input buffer of FIG. 4 are output for post-processing and 1024 samples of new data from a third channel of the second set (e.g., set one, channel three) are placed into the third column locations of the input buffer.

FIG. 5 shows the subsequent operation when the third column corresponding to the next 128 samples of all 8 channels for the initial set of data are transferred in parallel to I/O buffer unit 120, and the subsequent 1024 samples of the third channel (e.g., data segments 1.3) are copied into the third column of input buffer unit 112.

Figure 6:
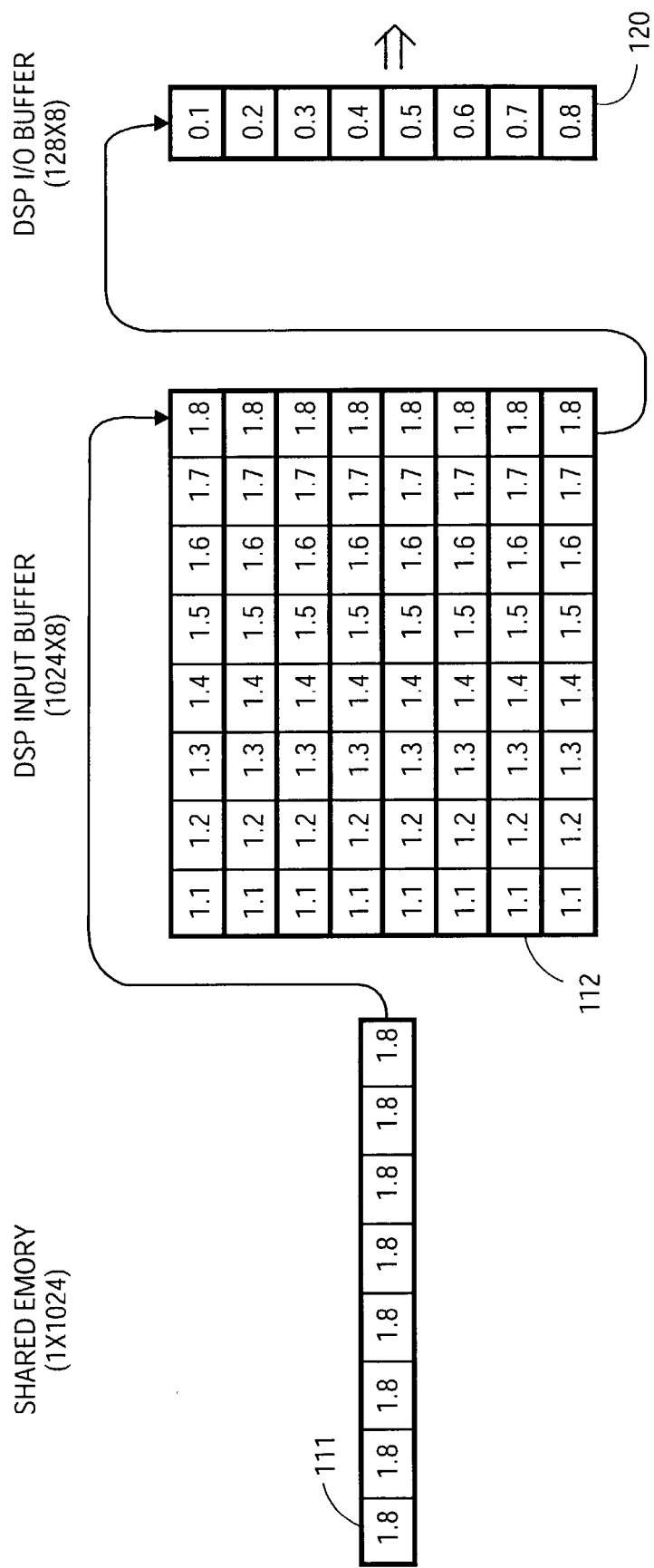
FIG. 6 illustrates a memory mapping of data when 128 samples for all 8 channels located in all eight columns of the input buffer of FIG. 2 are output for post-processing and all eight 1024-sample blocks of new data are placed into all of the columns of the input buffer.

FIG. 6 shows the situation when the last 1024 samples of all 8 channels for the initial set are transferred from input buffer unit 112 and processed through I/O buffer unit 120. Accordingly, input buffer unit 112 now contains the second set of 1024 data samples of all 8 channels. The second set of 1024 data samples loaded into input buffer unit 120 are designated by data segments 1.1–1.8 across all 8 channels. In FIG. 2, the loading of the first set of 1024×8 decoded data samples were achieved across memory locations corresponding to the rows of the matrix. With the loading of the second set of 1024 samples into input buffer unit 112, the respective data segments for a given channel are arranged in memory locations corresponding to columns of the matrix. Again this arrangement is due to the input of channel data in serial format to input buffer unit 112 while the output is performed in parallel across 128 sample segment blocks of all 8 channels. However, the rate of input (1024 samples of one channel) is equal to the rate of the output (128×8 channels) for input buffer 112 so that the actual data transfer in and out of input buffer 112 remains the same. The net effect of the data transfer is zero, thereby allowing for overlaying of new data into the same buffer holding the old data.

Figure 7:
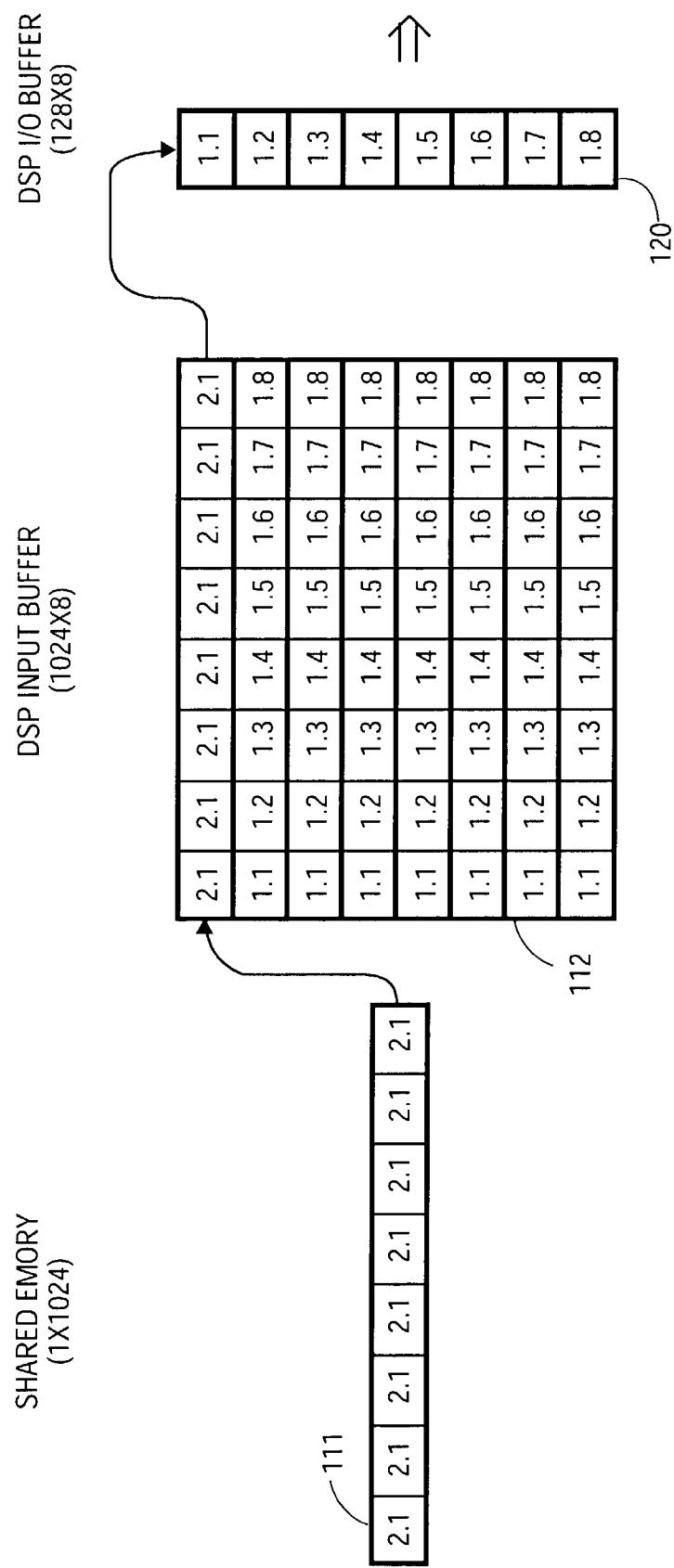
FIG. 7 illustrates a memory mapping of data when 128 samples for all 8 channels located in the first row of the input buffer of FIG. 6 are output for post-processing and 1024 samples of new data from a first channel of a third set (e.g., set two, channel one) are placed into the first row locations of the input buffer.

FIG. 7 now shows the output of the first 128 samples across all 8 channels for the second data set of 1024×8 samples stored within input buffer unit 112. Thus, the first 128 samples of all 8 channels for the second data set are taken across the first row of input buffer unit 112. In FIG. 7, this row of data segments is loaded into the respective locations of I/O buffer 120. At the same time (commencement of time period 3), the first 1024 samples of the third data set for the first channel (e.g., designated as 2.1) are loaded into the first row of input buffer unit 112. The entry of the 1024 samples across the first row of input buffer unit 112 correspond similarly to the same row of entries shown in FIG. 2. Accordingly, the loading sequence is now repeated to load the new data into row locations of input buffer 112. With odd and even sets of 1024×8 data groupings, the data will load into row locations with the odd set and into column locations with the even set. This arrangement allows the input data to overlap over outputted data in input buffer unit 112. The sequence is repeated for each set of 1024×8 data.

The overlay buffering makes it possible to use just one input buffer to collect new blocks of channel data from the decoder and perform post-processing by cutting the memory requirements in half over prior art techniques employing separate buffers. The matrix arrangement is a virtual arrangement of memory locations of input buffer 112 that may be accomplished by using non-contiguous regions in the buffer to store incoming blocks of channel data. As data segments in the buffer are output for post-processing in parallel across all channels, the total amount of memory freed in the buffer corresponds to the space needed for the next serial channel data input. By using these continuous segment blocks across the channels, an adequate amount of memory is provided to store the incoming segments of channel data from the decoder as they are delivered to the input buffer.

Figure 8:
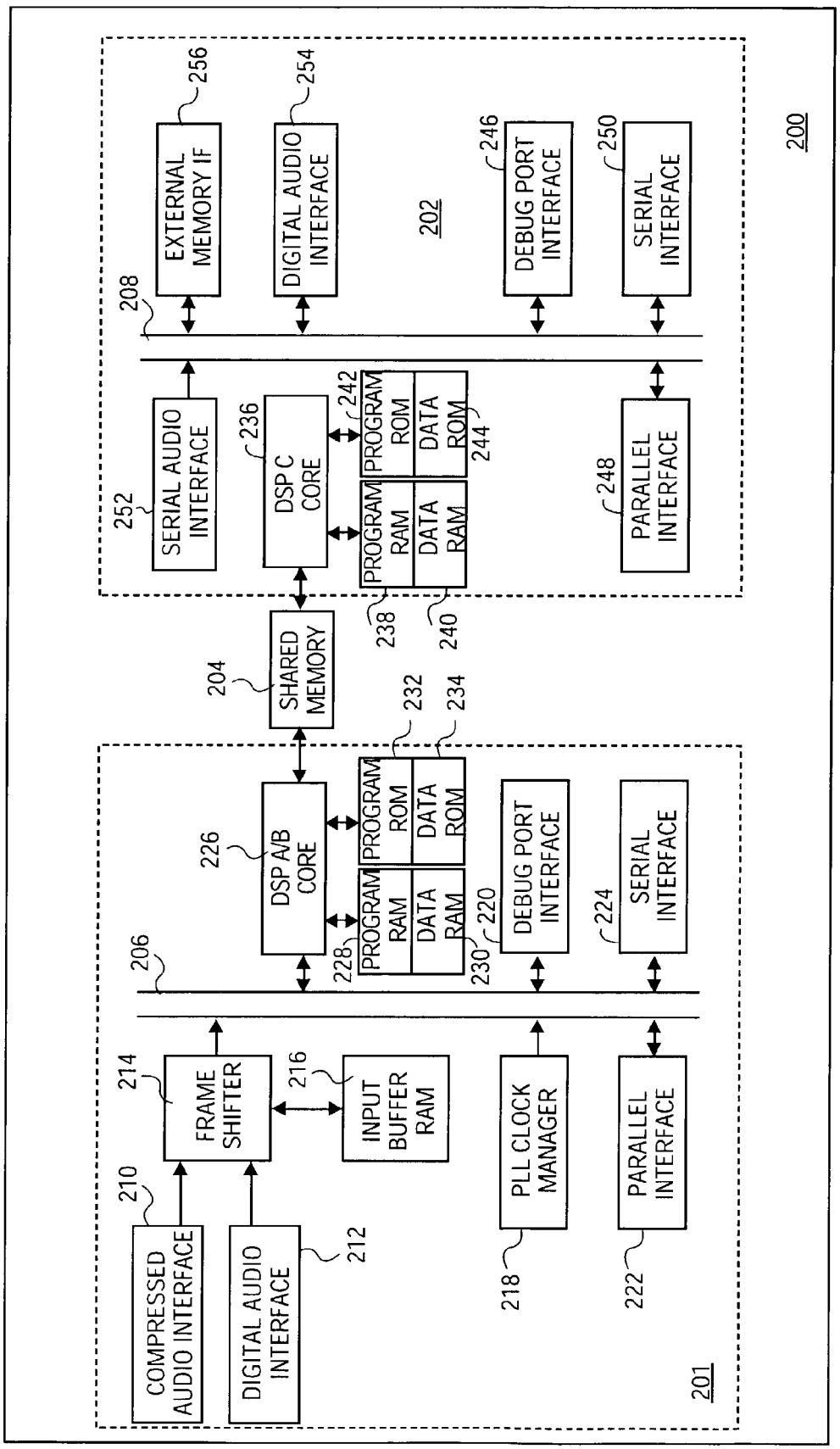
FIG. 8 illustrates a circuit block diagram of an exemplary audio codec using the overlaying scheme for the input buffer according to one embodiment of the invention.

FIG. 8 illustrates a circuit block diagram of an exemplary audio coder/decoder (codec) device 200 to decode and post-process (after decoding) audio data. Codec 200 performs various operations, including an overlay embodiment of the present invention. Codec 200 includes two DSPs 201 and 202, respectively having DSPA/B core 226 and DSPC core 236. The two respective DSP cores 226, 236 are coupled together via a shared memory unit 204. DSPs 201, 202, in turn, include a number of subcomponents. Some of the subcomponents are coupled together via corresponding bus 206 or 208. DSP 201 (with DSP A/B core 226) provides the decoding operation, and DSP 202 (with DSP C core 236) provides the post-processing operation.

Furthermore, DSP 201 of the exemplary embodiment includes a compressed audio interface 210 to receive compressed audio data in; a digital audio interface 212 to receive audio data input; a frame shifter 214; an input buffer random-access-memory (RAM) unit 216 to buffer and format received data for decoding; a phase-locked-loop (PLL) clock manager 218 to receive input clock signals and to generate clocks required to run the DSP and peripherals; a debug port interface 220 for debug operations; parallel interface (IF) 222 and serial interface (IF) 224, which may be coupled to a host processor; and DSP A/B core 226 with associated program and data RAM and ROM units 228, 230, 232, 234. In an alternative embodiment of the present invention, DSP 201 includes a timer and a general-purpose input/output (GPIO) port and I/O controller.

DSP 202 of the illustrated embodiment of FIG. 8 similarly includes DSP C core 236 with associated program and data RAM and ROM units 238, 240, 242, 244; debug port interface 246; parallel interface 248, and serial interface 250. DSP 202 of the illustrated embodiment further includes a serial audio interface 252 to receive audio data input; a digital audio interface 254 to send audio data out; and external memory interface (IF) 256 to couple codec 200 to an external memory unit or system (not shown). In an alternative embodiment of the present invention, DSP 202 may include a general purpose I/O port and I/O controller (GPIO). The exemplary DSP 202 provides the post-processing for the decoded signal from DSP 201.

Although separate debug port interfaces 220, 246, parallel interfaces 222, 248, and serial interfaces 224, 250 have been shown, such interfaces may be consolidated, multiplexed together, or eliminated in alternative embodiments of the present invention. Alternative embodiments of the present invention may also include variations in similarly illustrated components. For example, in one embodiment, DSP A/B core 226 is a 24-bit audio decoder, and DSP C core 238 is a 32-bit post-processor. Communication between DSP 201, DSP 202, and a host coupled to codec 200 is provided by utilizing a variety of mechanisms including parallel interfaces 222, 248 and/or serial interfaces 224, 250, and shared memory unit 204, as well as a set of one or more interprocessor communication (IPC) registers (not shown). In one particular embodiment, DSP 201 operates as a slave to DSP 202.

In reference to the earlier Figures, shared memory 204 corresponds to shared memory 111 of FIG. 1. When received audio data is decoded by DSP 201, the decoded data is sent to shared memory 204. The data is sent one channel at a time. When operating equivalently to the description of the shared memory 111, the decoded data is stored in shared memory 204 in 1024 sample increments for a given channel (8 segments×128 samples). When DSP 201 fills shared memory 204 with a new channel of data, DSP 201 either triggers an interrupt in DSP 202 or sets a flag in shared memory 204. DSP 202 then moves the channel data from shared memory 204 to its input buffer, which is part of data RAM 240. Thus, input buffer 112 of the earlier Figures is included within data RAM 240. DSP 202 then sets a flag informing DSP 201 that shared memory is free.

The input buffer (part of data RAM 240) of DSP 202 operates as the input buffer unit 112 to perform the overlay buffering of the incoming data. DSP 202 then performs the post-processing operation and places the processed data in the output FIFO buffer. RAM 240 provides the memory locations corresponding to input buffer unit 112, processing buffer unit 113, and, in some instances, output FIFO unit 114. In one embodiment, DSP 201 operates on 24-bit data, and DSP 202 operates on 32-bit data. In another embodiment, the data output at FIFO 114 is a 24-bit data after post-processing. DSP 201, 202 operate on 8 channels of data in one embodiment, but such number of channels or bit lengths are design choices for codec 200.

Figure 9:
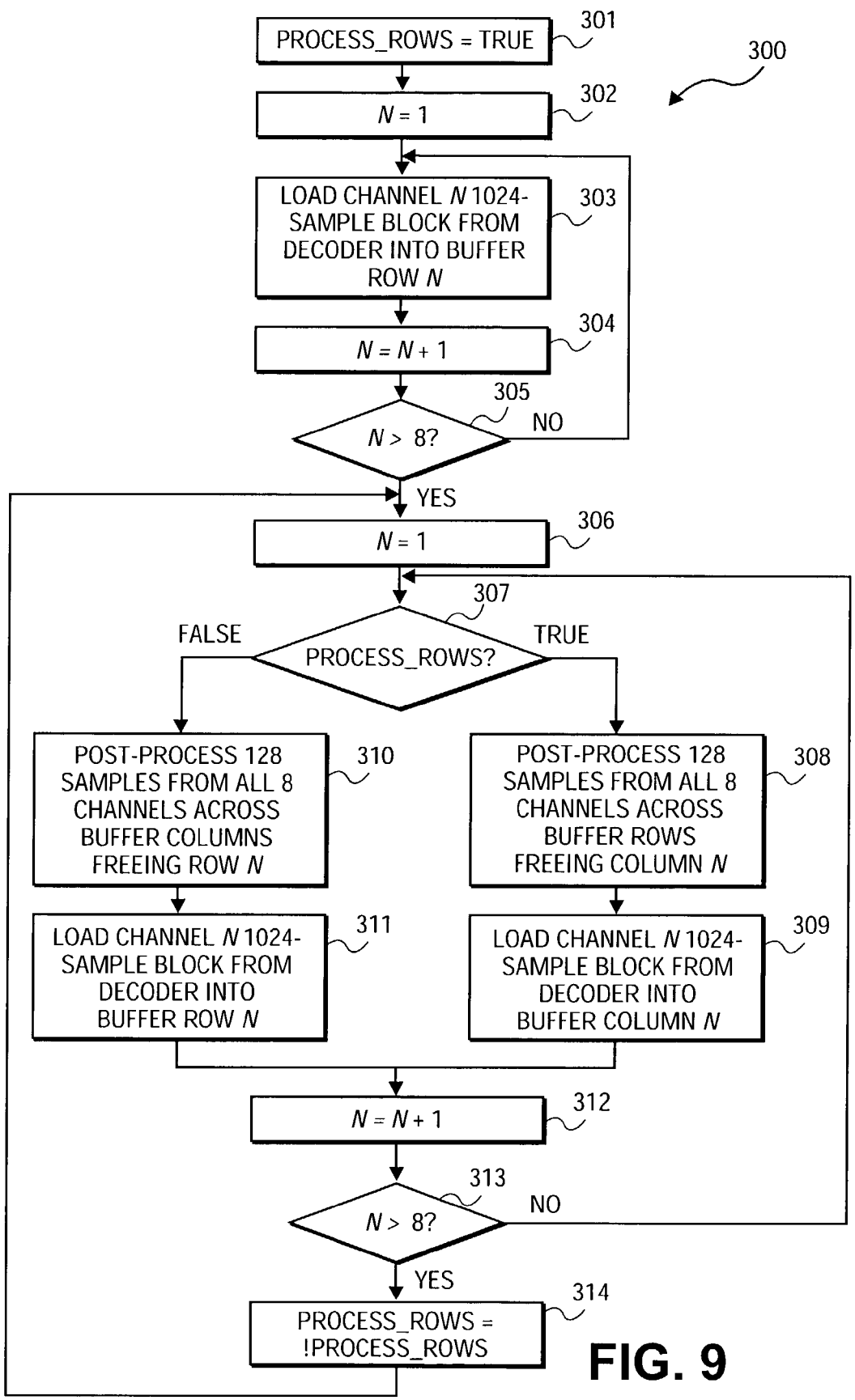
FIG. 9 illustrates a flow chart diagram of an exemplary technique to provide the overlay buffering for the input buffer.

Referring to FIG. 9, a flow chart 300 illustrates a process flow performed by a computer program, such as an operating system associated with a DSP to achieve the overlay operation for the input buffer. In the exemplary diagram, the program is set to operate on the rows (see block 301) and initialized to row 1 by setting N equal to one (see block 302). For row 1, 1024 decoded samples are loaded into the buffer (see block 303), and the row number N is incremented (see block 304) until all eight rows are loaded with the decoded samples (see block 305). Thus, the upper portion loads the initial N 1024-sample channels into the input buffer prior to the commencement of post-processing.

The bottom portion of diagram 300 from blocks 306 to 314 loads subsequent data into the input buffer and also controls the output of the parallel data from the buffer. N is again initialized (see block 306), and the output is determined as either row or column output (see block 307). The data is post-processed (see block 308 for row output or block 310 for column output), and new decoded data loaded into the freed segment locations of the buffer (see block 309 for row input or block 311 for column input). N is incremented (see block 312), and the process is repeated for the eight transfers and loads (see block 313). Once all eight rows (or columns) are processed with the output of buffered data and input of new data into the buffer, the row/column sequence is switched (see block 314), to alternate between row and column respectively, in order to receive serial data in and output parallel data (the 1 in block 314 denotes the inversion of the current logic value of PROCESS_ROWS). This algorithm is exemplary, and other program routines may be readily implemented to perform equivalent operations.

The program routine to control the data transfer to and from the various memory/buffer units may be part of an operating system program or a separate application program. Furthermore, such programs may be provided as part of the codec/DSP (such as part of a program ROM) or, alternatively, the program may be provided separately from the codec and subsequently loaded into the codec/DSP. The program may be obtained from a network, such as the Internet, or provided on a machine-readable medium, such as a floppy disk or a compact disk (CD).

Thus, a method and apparatus to provide overlay buffering is described. The overlaying scheme is described in reference to decoding and processing audio data in a codec/DSP. However, the technique may be implemented with other forms of data and may be implemented with data of various sizes. The embodiments to practice the present invention is not limited to 1024 samples and/or to an 8 by 8 matrix arrangement for storage of data. Furthermore, the input buffer unit, as well as other memory units, may employ contiguous and non-contiguous memory locations. The "row by column" example is utilized to explain the invention and is not described to limit the invention.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

We claim:

1. An apparatus comprising:
an input unit to source a sample block of decoded data in serial format;
an output unit to receive respective segments of decoded data to be post-processed in parallel format; and
an input buffer unit to receive sample blocks of the decoded data from said input unit and to store the sampled data in a virtual matrix of n rows by m columns; wherein serial sample segments of decoded data are to be stored in a particular row or column and to output respective stored sample segments in parallel format to said output unit, said input buffer unit to receive a first sample data set into rows of the matrix and to output corresponding sample segments of the first sample data set in parallel from a column, and as said sample segments of the first sample data set are outputted, said input buffer unit to receive segments of a second sample data set into columns of the matrix from which the sample segments of the first sample data set have already been read, and after said second sample data set is stored in said input buffer unit, to output corresponding sample segments in parallel from a row.

2. The apparatus of claim 1, wherein said input unit is a shared memory.

3. The apparatus of claim 1, wherein the sample block Is a block of 1024 samples.

4. The apparatus of claim 1, wherein said input buffer Is arranged as an 8 by 8 matrix.

5. The apparatus of claim 4, wherein the sample block is a block of 1024 samples arranged into 8 segments of 128 samples for each of 8 data channels.

6. The apparatus of claim 1, wherein said output unit is a memory to store data output from said input buffer to be post-processed.

7. The apparatus of claim 6, wherein the decoded data is audio data.

8. A method comprising:
sourcing, by an input unit, a sample block of decoded data in serial format;
receiving, by an output unit, respective segments of decoded data to be post-processed in parallel format;
receiving, by an Input buffer unit, sample blocks of the decoded data from said input unit;
storing, by said input buffer unit, the sampled data in a virtual matrix of n rows by m columns, wherein serial sample segments of decoded data are to be stored in a particular row or column;
outputting, by said input buffer unit, respective stored sample segments in parallel format to said output unit;
receiving, by said input buffer unit, a first sample data set into rows of the matrix;
outputting, by said input buffer unit, corresponding sample segments of the first sample data set in parallel from a column;
as said sample segments of the first sample data set are outputted, receiving, by said input buffer unit, segments of a second sample data set into columns of the matrix from which the sample segments of the first sample data set have already been read; and
after said second sample data set is stored in said input buffer unit, outputting, by said input buffer unit, corresponding sample segments in parallel from a row.

9. The method of claim 8, wherein sourcing, by an input unit, a sample block of decoded data in serial format further comprises;
sourcing, by a shared memory, the sample block of decoded data in serial format.

10. The method of claim 8, wherein sourcing, by an input unit, a sample block of decoded data in serial format further comprises:
sourcing, by the input unit, a block of 1024 samples of decoded data in serial format.

11. The method of claim 8, further comprising:
arranging said input buffer unit as an 8 by 8 matrix.

12. The method of claim 10, wherein sourcing, by an input unit, a sample block of decoded data in serial format further comprises:
sourcing, by the input unit, a block of 1024 samples arranged into 8 segments of 128 samples for each of 8 data channels in serial format.

13. The method of claim 8, further comprising:
storing data output from said input buffer to be post-processed in said output unit that is a memory.

14. The method of claim 13, further comprising:
processing audio data as the decoded data.

\* \* \* \* \*